(12) United States Patent
Johnson

(10) Patent No.: US 8,878,945 B2
(45) Date of Patent: *Nov. 4, 2014

(54) PHASOR-BASED PULSE DETECTION

(71) Applicant: Lockheed Martin Corporation, Bethesda, MD (US)

(72) Inventor: James A. Johnson, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,304

(22) Filed: Nov. 22, 2013

(65) Prior Publication Data

US 2014/0079159 A1 Mar. 20, 2014

Related U.S. Application Data

(63) Continuation of application No. 13/308,107, filed on Nov. 30, 2011, now Pat. No. 8,593,525.

(51) Int. Cl.
| | |
|---|---|
| *H04N 17/02* | (2006.01) |
| *H04L 27/01* | (2006.01) |
| *H04B 1/10* | (2006.01) |
| *H04L 27/26* | (2006.01) |
| *G01S 7/285* | (2006.01) |
| *H04B 1/16* | (2006.01) |
| *G06F 7/52* | (2006.01) |

(52) U.S. Cl.
CPC . *H04B 1/16* (2013.01); *G01S 7/285* (2013.01); *G06F 7/52* (2013.01)
USPC ........... 348/193; 348/192; 375/227; 375/340; 375/346

(58) Field of Classification Search
USPC ................... 348/180, 192, 193, 21, 607, 614; 375/224, 227, 228, 285, 340, 346; 702/66, 69, 74, 189; 714/819; 327/18, 327/20, 63, 91, 98
See application file for complete search history.

(56) References Cited

U.S. PATENT DOCUMENTS

| | | | |
|---|---|---|---|
| 5,313,497 | A | 5/1994 | Sadot et al. |
| 5,585,791 | A | 12/1996 | Paterson et al. |
| 5,621,478 | A | 4/1997 | Demmer |
| 5,828,701 | A | 10/1998 | Henriksson |

(Continued)

*Primary Examiner* — Victor Kostak
(74) *Attorney, Agent, or Firm* — Miles & Stockbridge P.C.; James T. Carmichael

(57) ABSTRACT

A phasor-based pulse detection system includes a first multiplier stage configured to apply a first delayed conjugate multiplication operation to an input signal. The system can also include a second multiplier stage coupled to the first multiplier stage and configured to apply a second delayed conjugate multiplication operation to an output of the first multiplier stage, and an absolute value unit coupled to the second multiplier stage and configured to perform an absolute value operation on an output of the second multiplier stage. The system can further include video filter stage coupled to the absolute value unit and configured to perform a video filtering operation on an output of the absolute value unit. The system can also include a hysteresis detector coupled to the video filter stage, the hysteresis detector configured for detecting a signal in a filtered video signal received from the video filter stage, the detecting including determining a signal start when the filtered video signal exceeds a predetermined detection threshold for a first predetermined number of consecutive samples, and determining a signal end when the filtered video signal falls below a predetermined rejection threshold for a second predetermined number of consecutive samples.

19 Claims, 4 Drawing Sheets

(56) References Cited

U.S. PATENT DOCUMENTS

| | | |
|---|---|---|
| 6,272,185 B1 | 8/2001 | Brown |
| 6,611,724 B1 | 8/2003 | Buda et al. |
| 7,280,621 B1 | 10/2007 | Murphy |
| 7,336,739 B2 | 2/2008 | Petzold et al. |
| 7,515,582 B2 | 4/2009 | Wang |
| 7,519,121 B2 | 4/2009 | Matsushita et al. |
| 2001/0014086 A1* | 8/2001 | Jeong et al. ............. 370/335 |
| 2003/0043947 A1 | 3/2003 | Zehavi et al. |
| 2005/0220222 A1* | 10/2005 | Marsili ..................... 375/320 |
| 2007/0291632 A1* | 12/2007 | Li et al. .................... 370/203 |
| 2008/0177508 A1 | 7/2008 | Veith et al. |
| 2009/0305642 A1* | 12/2009 | Ezaki ....................... 455/67.13 |
| 2010/0027718 A1* | 2/2010 | Vaidyanathan et al. ...... 375/340 |
| 2010/0135367 A1 | 6/2010 | Schmid |
| 2011/0119008 A1 | 5/2011 | Chuang et al. |
| 2011/0150144 A1* | 6/2011 | Sohn ......................... 375/340 |
| 2013/0064337 A1 | 3/2013 | Hofmann et al. |

* cited by examiner

PHASOR-BASED PULSE DETECTION

Embodiments are generally related to signal detection and, more particularly, to a phasor-based signal (pulsed or continuous-waveform) detection system.

Electronic Support Measures (ESM) and other signal analysis systems often depend on proper detection of signals of interest. General considerations when designing such a system include: probability of detection, probability of false alarm (or false alarm rate), minimum signal-to-noise ratio (SNR) at which above considerations are met, and parametric accuracy (e.g., frequency, pulse width, amplitude, and the like).

Legacy analog receiver systems tend to use a (non-coherent) square-law detector, having a fixed threshold. Such systems may be capable of a 12-14 dB SNR, depending on log video filtering and pulse width. Longer video filters can achieve good detectability at lower SNR, but limit the pulse width at which it is effective and make the pulse edges difficult to time precisely.

More recent digital systems have a larger range of techniques available, including band-limiting filtering (channelization), Fourier analysis, and matched-filter implementations. A basic square-law detector process (with video filtering) is straight forward, and simple to implement in a real-time pipe-lined system; however, except for tailoring of the video filter coefficients, it offers no substantial performance benefit over an analog system. The present invention was conceived in light of the above-mentioned considerations and limitations of conventional systems, among other things.

One embodiment includes a phasor-based signal detection system having a multiplier section, configured to apply one or more delayed conjugate multiplication operations to an input signal and an absolute value unit coupled to the multiplier section and configured to perform an absolute value operation on an output of the multiplier section. The system can also include a video filter stage coupled to the absolute value unit and configured to perform a video filtering operation on an output of the absolute value unit, and a hysteresis detector coupled to the video filter stage, the hysteresis detector configured for detecting presence of a signal in a filtered video signal received from the video filter stage, the detecting including determining a signal start when the filtered video signal exceeds a predetermined detection threshold for a first predetermined number of consecutive samples, and determining a signal end when the filtered video signal falls below a predetermined rejection threshold for a second predetermined number of consecutive samples.

The multiplication section can include one multiplier stage or two multiplier stages. Further, the detection threshold and the first predetermined number of consecutive samples can be determined based on a desired false alarm rate.

Another embodiment includes a signal detection system having a first multiplier stage configured to apply a first multiplication operation to an input signal and a second multiplier stage coupled to the first multiplier stage and configured to apply a second multiplication operation to an output of the first multiplier stage. The system can also include an absolute value unit coupled to the second multiplier stage and configured to perform an absolute value operation on an output of the second multiplier stage, and a hysteresis detector coupled to the absolute value unit, the hysteresis detector configured for detecting presence of a signal in a signal received at the hysteresis detector, the detecting including determining a signal start when the signal received at the hysteresis detector exceeds a predetermined detection threshold for a first predetermined number of consecutive samples, and determining a signal end when the signal received at the hysteresis detector falls below a predetermined rejection threshold for a second predetermined number of consecutive samples.

The system can also include a video filter disposed in a signal path between the absolute value unit and the hysteresis detector. The detection threshold and the first predetermined number of consecutive samples can be determined based on a desired false alarm rate. The first predetermined number of consecutive samples can be two and the second predetermined number of consecutive samples can be five. The first multiplication operation can be a delayed conjugate multiplication. The second multiplication operation is a delayed conjugate multiplication.

Another embodiment can include a method for phasor-based signal detection that includes multiplying an input signal at each of a plurality of multiplication stages, the plurality of multiplier stages being connected in series such that an output of one multiplication stage is provided to a next subsequent stage in series. The method can also include performing an absolute value operation, at an absolute value unit, on a result from a last multiplier stage of the plurality of multiplier stages. The method can further include detecting a signal at a hysteresis detector, the detecting including determining a signal start when a signal received at the hysteresis detector exceeds a predetermined detection threshold for a first predetermined number of consecutive samples, and determining a signal end when the signal received at the hysteresis detector falls below a predetermined rejection threshold for a second predetermined number of consecutive samples.

The method can optionally include performing a video filtering operation at a video filter disposed in a signal path between the absolute value unit and the hysteresis detector. The detection threshold and the first predetermined number of consecutive samples are determined based on a desired false alarm rate. The first predetermined number of consecutive samples can be two and the second predetermined number of consecutive samples can be five.

The plurality of multiplication stages can include a first multiplication stage and a second multiplication stage. The multiplying can include performing a first delayed conjugate multiplication operation at the first multiplication stage. The multiplying can also include performing a second delayed conjugate multiplication operation at the second multiplication stage.

DETAILED DESCRIPTION

As used herein, phasor (or phase vector) refers to a complex (real and imaginary parts) representation of a sinusoid.

Figure 1:
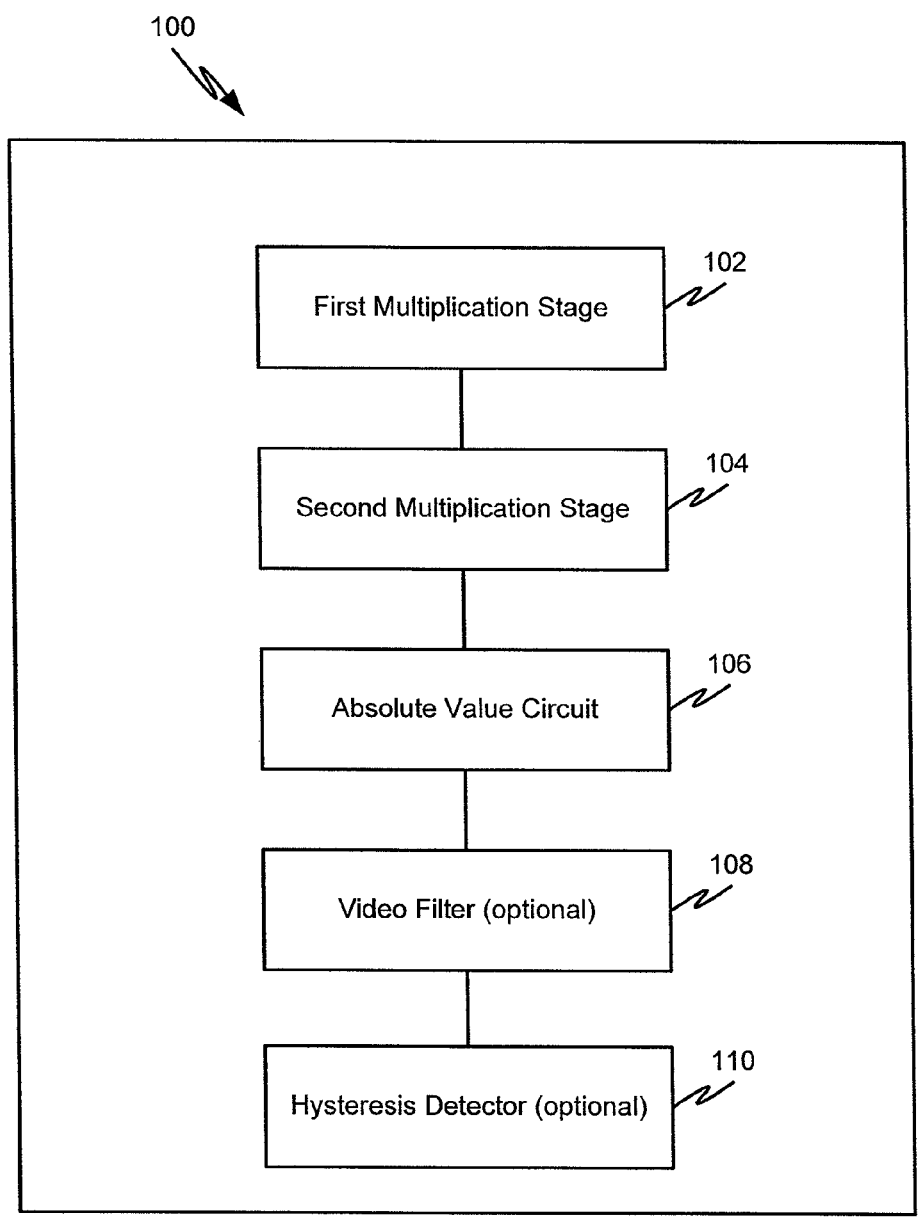
FIG. 1 is a block diagram of a phasor-based detector in accordance with at least one embodiment.

FIG. 1 is a block diagram of an exemplary phasor-based detector 100 in accordance with at least one embodiment. The detector 100 includes a first multiplication stage 102, a second multiplication stage 104, an absolute value circuit 106, an optional video filter 108 and an optional hysteresis detector 110.

In operation, the first multiplication stage 102 receives an input signal (e.g., from a complex sampling device). The first multiplication stage 102 performs a delayed conjugate multiplication operation and sends the resulting signal to the second multiplication stage 104, which performs a second delayed conjugate multiplication operation. The output of the second multiplication stage 104 is passed to an absolute value circuit 106.

The output of the absolute value circuit 106 can then be passed to an optional video filter 108, which produces a filtered video signal.

The filtered video signal can be supplied to an optional hysteresis detector 110. The hysteresis detector 110 detects the start of a signal when the filtered video signal remains above a detection threshold for a predetermined number of consecutive samples. The hysteresis detector 110 detects the end of a signal when the filtered video signal falls below a "rejection" threshold for a predetermined number of consecutive samples. A detector (e.g., 100) can be used in systems such as RADAR, phased array antenna communication system, ESM (electronic support measures), RWR (radar warning and receiver), ELINT (electronic intelligence), COMMINT (communications intelligence), or the like.

While two multiplication stages are shown in FIG. 1, it will be appreciated that a single multiplication stage can be used (see, e.g., FIG. 4) or more than two multiplication stages may be used.

Figure 2:
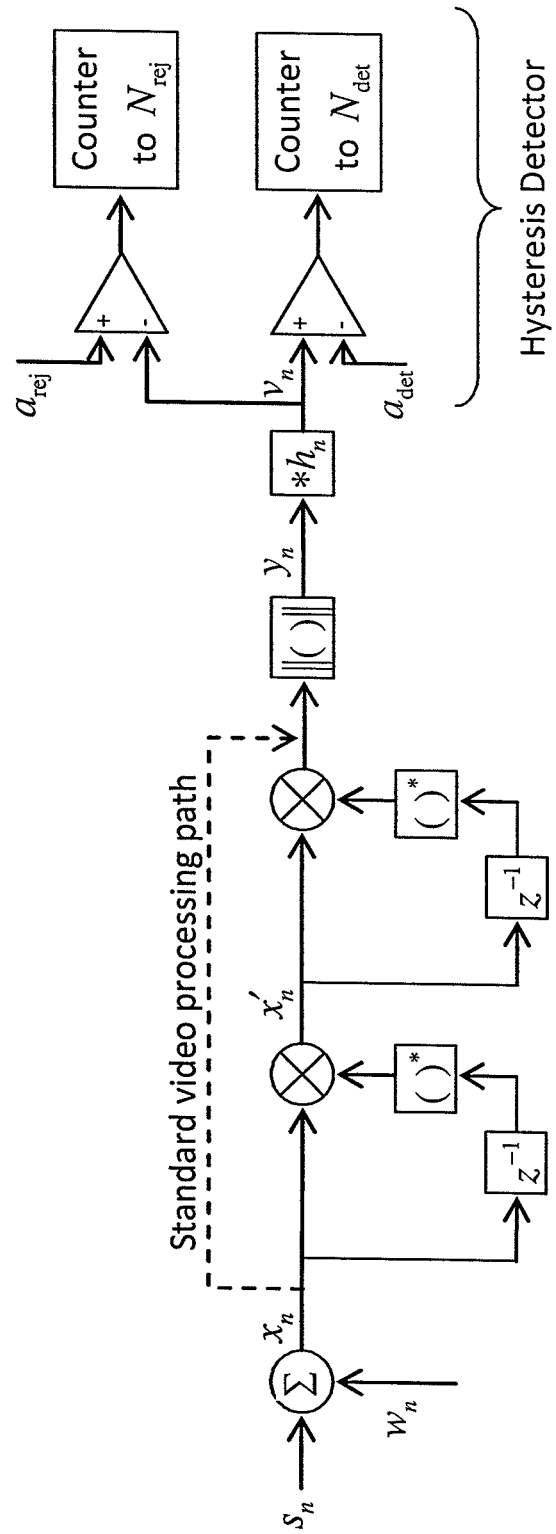
FIG. 2 is a system process diagram of a phasor-based detector in accordance with at least one embodiment.
Figure 4:
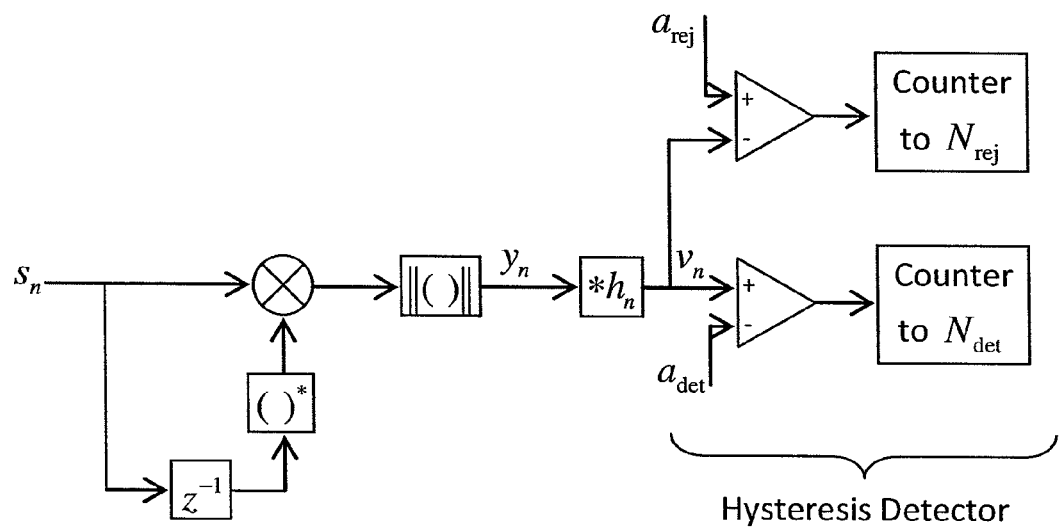
FIG. 4 is a system process diagram of a phasor-based detector having a single multiplication stage in accordance with at least one embodiment.

FIGS. 2 and 4 are system diagrams of exemplary phasor-based detectors, in which:

$f_s$ is the digital sample rate;

$T_s$ is the sample period; $T_s = 1/f_s$;

$\{s_n\}$ is the complex noise-free signal to be detected; $s(t) = Ae^{j\omega t}$, where $\omega$ is the signal frequency [rad/s], and $t = nT_s$;

$\{w_n\}$ is complex additive white (uncorrelated) Gaussian noise;

$x_n = s_n + w_n$; (or, in the case of FIG. 4, $X_n = S_n$); $S_n$ can be the output of a complex sampling device (e.g., a complex-value signal generated from a receiver system with I/Q (In-phase/Quadrature) sampling, which can be accomplished using an analog-to-digital sampler (A/D) followed by a complex envelope filter (CEF));

$y_n = \|(x_n x^*_{n-1})(x_{n-1} x^*_{n-2})^*\| = \|x_n x_{n-2}(x^*_{n-1})^2\|$; this is the video signal using Phasor manipulation;

$$v_n = \sum_{k=0}^{L-1} y_{n-k} h_k;$$

filtered video, with $\{h_k\}$ being the real-valued video filter coefficients;

$a_{det}$ is the detection threshold used to detect the leading edge of a pulse;

$a_{rej}$ is the "rejection" threshold used to detect the trailing edge of a pulse, $a_{rej} \leq a_{det}$ (to provide detection hysteresis);

$N_{det}$ is the number of consecutive video samples required be above detection threshold to trigger pulse detection; and $N_{rej}$ is the number of consecutive video samples required to be below rejection threshold to finalize pulse detection.

In operation, an input signal is added with white Gaussian noise (FIG. 2), followed by two stages of delayed conjugate multiplication, or one stage (FIG. 4), and an absolute value function which produces an unfiltered video signal. The summing circuit for adding a white noise signal to an input signal is shown in FIG. 2 for illustration purposes and is not necessarily needed in an operational implementation or embodiment. The white noise summing circuit may be used for calibration and/or other functions such as selecting or tuning parameters. The video filter stage helps smooth the signal, which feeds a hysteresis detector. A "pulse detected" state is entered when the filtered video signal equal or exceeds the detection threshold $a_{det}$ for $N_{det}$ consecutive samples or more. The pulse (or other type of signal) is terminated when the filtered video falls below the "rejection threshold," $a_{rej}$, for $N_{rej}$ consecutive samples.

The selection of $a_{det}$, $N_{det}$, $a_{rej}$, $N_{rej}$ and the video filter can be chosen to meet performance goals. Longer video filters provide better detectability for long pulses, but time of arrival and narrow pulse performance are compromised. The parameters $a_{det}$ and $N_{det}$ should be chosen based on two criteria. First, they should be large enough to achieve the required false alarm rate. A value of $N_{det} = 2$ is suggested to prevent single noise spikes from starting a detection sequence.

A second consideration is overall performance. Low thresholds can result in pulse fragmentation, and detection of pulses so low in SNR that adequate measurement accuracy (e.g. frequency) cannot be achieved. $a_{rej}$ and $N_{rej}$ should be chosen to achieve accurate pulse measurement, and to "ride through" the nulls associated with phase transitions within a PSK or other type of modulated signal.

The video filter can influence the ideal threshold settings, so the threshold used may depend on the video filter properties. Generally speaking, longer pulses can use longer video filters, and achieve better performance than narrower pulses which require shorter video filters; achievable SNR depends on pulse width.

Time Domain Analysis

When a signal is present (CW, or a pulse-gated sinusoid), the sample-to-sample amplitude and phase should be consistent, i.e.

$$x'_n = x_n x^*_{n-1} \tag{0.1}$$

$$= (s_n + w_n)(s_{n-1} + w_{n-1})^*$$

$$= s_n s^*_{n-1} + s_n w^*_{n-1} + w_n s^*_{n-1} + w_n w^*_{n-1}$$

$$= Ae^{j\omega n T_s} \cdot Ae^{-j\omega(n-1)T_s} + Ae^{j\omega n T_s} \cdot w^*_{n-1} + w_n Ae^{-j\omega(n-1)T_s} + w_n w^*_{n-1}$$

$$= A^2 e^{j\omega T_s} + Ae^{j\omega n T_s} \cdot w^*_{n-1} + w_n Ae^{-j\omega(n-1)T_s} + w_n w^*_{n-1}$$

This describes the first delayed conjugate product. The dominating term is a constant Phasor, $A^2 e^{j\omega T_s}$, which is a constant.

Performing this delayed conjugate product once more, $$y_n = x'_n x'^*_{n-1} \tag{0.2}$$

$$= A^4 + A^3 \begin{pmatrix} 2e^{j\omega(n-1)T_s} w^*_{n-1} + e^{j\omega T_s} \cdot w_{n-2} + \\ e^{-j\omega(n-2)T_s} w_n + e^{-2j\omega(n-1)T_s} w_n w_{n-2} \end{pmatrix} +$$

-continued $$A^2\begin{pmatrix} 2e^{j\omega T_s}w_{n-1}^*w_{n-2} + e^{j\omega T_s}w_n w_{n-1}^* + \\ e^{-j\omega T_s}w_n w_{n-1}^* + e^{-2j\omega T_s}w_{n-1}^*w_{n-1}^* \end{pmatrix}$$

$$A\begin{pmatrix} 2e^{-j\omega(n-1)T_s}w_n w_{n-1}^*w_{n-2} + e^{j\omega nT_s} \cdot \\ w_{n-1}^*w_{n-1}^*w_{n-2} + e^{j\omega(n-2)T_s}w_n w_{n-1}^*w_{n-1}^* \end{pmatrix} +$$

$$(w_n w_{n-1}^* w_{n-1}^* w_{n-2})$$

With no signal (A=0), only the last noise term remains. The equation, shows that $A^4$, a constant, clearly dominates, and is independent of signal frequency. The remaining terms, by comparison, fall away quickly as A increases. Those components containing noise terms are mathematically intractable—Product Normal Distributions beyond two terms do not have a closed form solution. However, these terms have an expected value of zero (zero-mean).

Video filtering (assuming unity DC response) will leave the $A^4$ term alone, while suppressing the remaining terms.

Frequency Domain Analysis

When a pulse is present, the time domain signal $x_n = Ae^{j\omega_0 nT_s}$ is represented in the frequency domain as $X(\omega) = 2\pi A\delta(\omega-\omega_0)$. Using standard DTFT transforms, the following equivalencies hold (ignoring the additive noise):

$x_n = Ae^{j\omega_0 nT_s} \Leftrightarrow X(\omega) = 2\pi A\delta(\omega-\omega_0)$ $x^*_n \Leftrightarrow X^*(-\omega) = 2\pi A\delta(-\omega-\omega_0)$ $x_{n-1} \Leftrightarrow e^{-j\omega}X(\omega) = e^{-j\omega}2\pi A\delta(\omega-\omega_0)$ $x^*_{n-1} \Leftrightarrow e^{j\omega}X^*(-\omega) = e^{j\omega}2\pi A\delta(-\omega-\omega_0)$ $x'_n = x_n x^*_{n-1} \Leftrightarrow X'(\omega) = X(\omega)*[e^{j\omega}X^*(-\omega)] = (2\pi A)^2 e^{j\omega_0}\delta(\omega)$ $x'_{n-1} = x_{n-1}x^*_{n-2} \Leftrightarrow e^{-j\omega}X'(\omega) = e^{j\omega_0}(2\pi A)^2\delta(\omega)$ $(x_n x^*_{n-1})(x_{n-1}x^*_{n-2})^* \Leftrightarrow X'(\omega)*[e^{j\omega}X'(\omega)]^* = (2\pi A)^4\delta(\omega)$ We see that the sinusoid, regardless of frequency, translates to a single real peak at ω=0, as it passes through the delayed conjugate multiplication stages. The presence of a constant frequency sinusoid in the input can be important to the benefits of this approach, and is how processing gain (and therefore better detectability) is achieved.

Parameter Accuracy

The accuracy to which frequency and amplitude can be estimated is a function of pulse width and SNR in that the more signal energy available, the better the parameters can be estimated. Pulse detectability at very low SNRs may not be practical if the corresponding pulse parameters cannot be estimated with sufficient accuracy.

Below are the Cramer-Rao Bounds for the estimation of amplitude and frequency.

$$\text{var}(\hat{A}) = \frac{\sigma_w^2}{N} \tag{0.3}$$

$$\text{var}(\hat{f}_0) \geq \frac{6}{(2\pi T_s)^2 \eta N(N^2-1)} \tag{0.4}$$

Where $\sigma_w^2$ is the noise variance (AWGN assumption) of a single sample;

$T_s$ is the sample period [s];

N is the number of samples in a pulse (~PW/$T_s$);

$$\eta = \frac{A^2}{\sigma_w^2}$$

is the SNR, where A is the pulse amplitude;

$\hat{f}_0$ is the estimated frequency, $$f_0 = \frac{\omega}{2\pi}.$$

Actual performance of frequency measurement depends on the estimation technique used. For higher SNRs, estimators can be found that approach the Cramer-Rao bound. Kay's method for estimating frequency uses the phase differences from sample to sample, and combines them:

$$\Delta_n = \angle x_n - \angle x_{n-1} \tag{0.5}$$
$$= \angle x_n x^*_{n-1}$$

$$\hat{f}_0 = \frac{f_s}{2\pi}\sum_{n=1}^{N-1} W_n \Delta_n \tag{0.6}$$

in which $W_n$ is a "whitening" weighting window. Note that $\Delta_n$ can be derived from the signal $x'_n$. The Cramer-Rao bound can only be achieved when the window coefficients are $$W_n = \frac{6n(N-n)}{N(N^2-1)}.$$

This is equivalent to a linear regression of phase, but avoids phase unwrapping issues.

A simpler estimator, using no window, is to use a rectangular weighting function, $$W_n = \frac{1}{N-1},$$

such that $$\hat{f}_0 = \frac{f_s}{2\pi}\frac{1}{N-1}\sum_{n=1}^{N-1}\Delta_n \tag{0.7}$$
$$= \frac{f_s}{2\pi}\frac{1}{N-1}(\angle x_{N-1} - \angle x_0)$$

which uses only the (properly unwrapped) phases at the end points of the sequence. The expected variance of this estimator is $$\text{Var}(\hat{f}_0) = \frac{1}{(2\pi T_s)^2(N-1)^2\eta}. \tag{0.8}$$

This is not an optimal estimator; (0.6) achieves the Cramer-Rao bound, whereas (0.7) does not. The ratio of the variances is given by:

$$\frac{\mathrm{Var}(\hat{f}_0)|_{nowindow}}{\mathrm{Var}(\hat{f}_0)|_{window}} = \frac{N+2}{6}.$$

Figure 3:
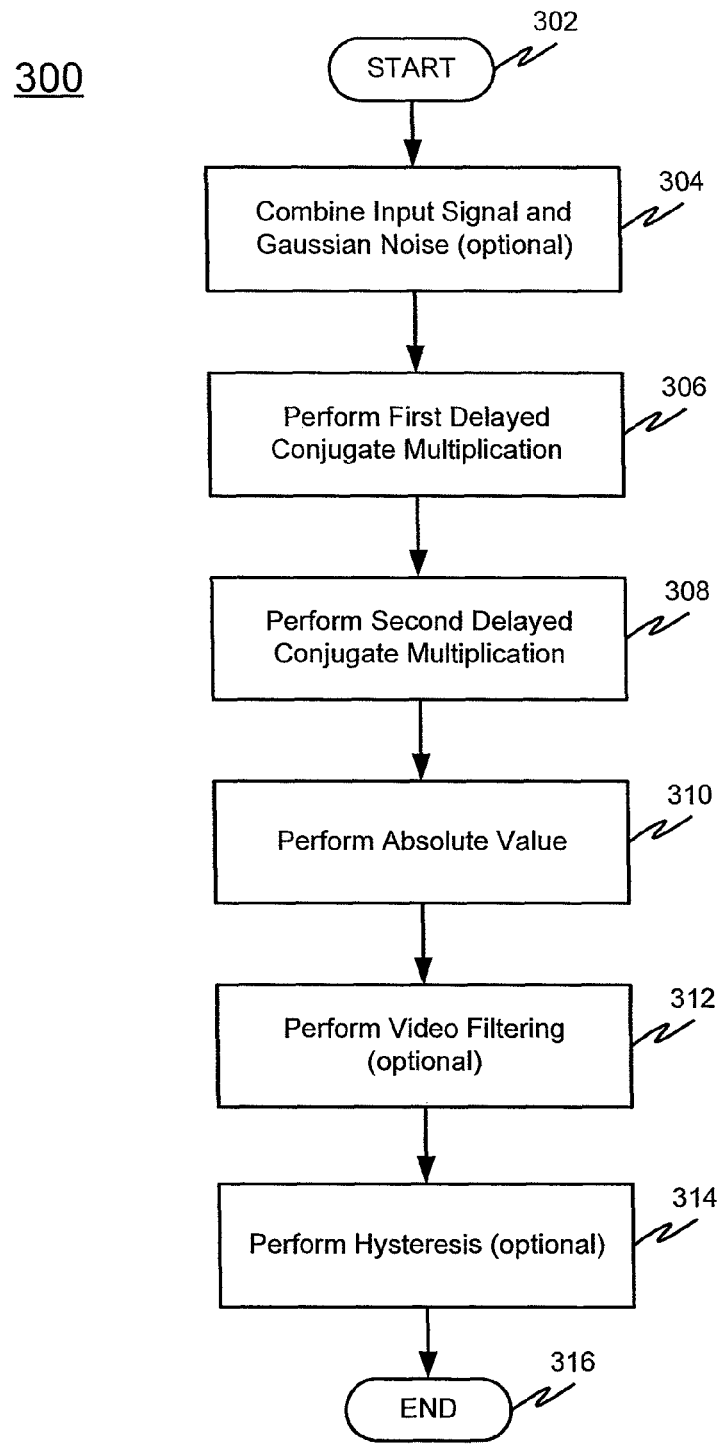
FIG. 3 is a chart showing an exemplary method of phasor-based detection in accordance with at least one embodiment.

FIG. 3 is a chart showing an exemplary method 300 of phasor-based detection. Processing begins at 302 and continues to 304.

At 304, an input signal is optionally combined with Gaussian noise (e.g., white noise). The combining of an input signal with noise can be used for testing, parameter selection, tuning or the like. If the combining is not desired, an input signal can be passed directly to a first multiplication stage (e.g. processing would progress from 302 to 306, bypassing 304). Processing continues to 306.

At 306, a first delayed conjugate multiplication operation is performed on the combined signal. Processing continues to 308.

At 308, a second delayed conjugate multiplication is performed on the result of the first multiplication. Processing continues to 310.

At 310, an absolute value function is applied to the result of the second multiplication. Processing continues to 312.

At 312, an optional video filtering operation is performed on a result of the absolute value function. Processing continues to 314.

At 314, an optional hysteresis detection operation is performed on the filtered video signal. The hysteresis detection operation can detect the start of a signal (e.g., pulse, modulated pulse or general purpose sinusoid) when the filtered video signal remains above a detection threshold for a predetermined number of consecutive samples. The hysteresis detection operation can detect the end of a signal when the filtered video signal falls below a "rejection" threshold for a predetermined number of consecutive samples. Processing continues to 316, where processing ends.

It will be appreciated that 304-314 can be repeated in whole or in part to perform a contemplated phasor-based signal detection process.

It will be appreciated that the modules, processes, systems, and sections described above can be implemented in hardware, hardware programmed by software, software instructions stored on a nontransitory computer readable medium or a combination of the above. A system for phasor-based signal detection, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the signal processing arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and computer readable media for phasor-based signal detection.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A phasor-based signal detection system comprising:
a multiplier section, configured to apply one or more delayed conjugate multiplication operations to an input signal;
an absolute value unit coupled to the multiplier section and configured to perform an absolute value operation on an output of the multiplier section; and
a hysteresis detector configured for detecting presence of a signal, the detecting including determining a signal start when a signal received at the hysteresis detector exceeds a predetermined detection threshold for a first predetermined number of consecutive samples, and determining a signal end when the signal received at the hysteresis detector falls below a predetermined rejection threshold for a second predetermined number of consecutive samples, the signal received at the hysteresis detector originating as an output of the absolute value unit.

2. The system of claim 1, wherein the multiplication section includes one multiplier stage.

3. The system of claim 1, wherein the multiplication section includes two multiplier stages.

4. The system of claim 1, wherein the detection threshold and the first predetermined number of consecutive samples are determined based on a desired false alarm rate.

5. The system of claim 1, further comprising a video filter disposed in a signal path between the absolute value unit and the hysteresis detector.

6. The system of claim 1, wherein the first predetermined number of consecutive samples is two.

7. The system of claim 1, wherein the second predetermined number of consecutive samples is five.

8. The system of claim 3, wherein a first multiplication operation is a delayed conjugate multiplication.

9. The system of claim 3, wherein a second multiplication operation is a delayed conjugate multiplication.

10. A method for phasor-based signal detection, the method comprising:
multiplying an input signal at each of one or more multiplication stages;
performing an absolute value operation, at an absolute value unit, on a result from the one or more multiplier stages; and
detecting a signal at a hysteresis detector, the detecting including determining a signal start when a signal received at the hysteresis detector exceeds a predetermined detection threshold for a first predetermined number of consecutive samples, and determining a signal end when the signal received at the hysteresis detector falls below a predetermined rejection threshold for a second predetermined number of consecutive samples.

11. The method of claim 10, further comprising performing a video filtering operation at a video filter disposed in a signal path between the absolute value unit and the hysteresis detector.

12. The method of claim 10, wherein the detection threshold and the first predetermined number of consecutive samples are determined based on a desired false alarm rate.

13. The method of claim 10, wherein the first predetermined number of consecutive samples is two.

14. The method of claim 10, wherein the second predetermined number of consecutive samples is five.

15. The method of claim 10, wherein the one or more multiplication stages includes a first multiplication stage and a second multiplication stage.

16. The method of claim 15, wherein the multiplying includes performing a first delayed conjugate multiplication operation at the first multiplication stage.

17. The method of claim 15, wherein the multiplying includes performing a second delayed conjugate multiplication operation at the second multiplication stage.

18. A phasor-based signal detection system comprising:
a multiplier section, configured to apply one or more delayed conjugate multiplication operations to an input signal;
an absolute value unit coupled to the multiplier section and configured to perform an absolute value operation on an output of the multiplier section comprising one or more delayed conjugate multiplication operations applied to the input signal;
a detector configured to perform signal detection on an output of the absolute value unit,
wherein the absolute value unit is directly coupled to the multiplier section.

19. The system of claim 18, wherein the detector is a hysteresis detector.

* * * * *